United States Patent [19]

Dicker et al.

[11] Patent Number: 4,622,372

[45] Date of Patent: Nov. 11, 1986

[54] POLYMER LIFE ENHANCEMENT IN OXYANION-CATALYZED POLYMERIZATION

[75] Inventors: Ira B. Dicker, Wilmington, Del.; Clyde S. Hutchins, Arlington, Tenn.; Harry J. Spinelli, Wilmington, Del.

[73] Assignee: E. I. Du Pont de Nemours and Company, Wilmington, Del.

[21] Appl. No.: 831,418

[22] Filed: Feb. 20, 1986

Related U.S. Application Data

[63] Continuation-in-part of Ser. No. 707,194, Mar. 1, 1985, abandoned.

[51] Int. Cl.[4] .............................................. C08F 5/58
[52] U.S. Cl. .................................... 526/190; 526/194
[58] Field of Search ............... 526/184, 190, 192, 194

[56] References Cited

U.S. PATENT DOCUMENTS

| | | | |
|---|---|---|---|
| 3,778,430 | 12/1973 | Citron | 526/194 |
| 4,041,227 | 8/1977 | Uraneck | 526/190 |
| 4,389,514 | 6/1983 | Schmidle | 526/184 |
| 4,414,372 | 11/1983 | Farnham | 526/194 |
| 4,417,034 | 11/1983 | Webster | 526/190 |
| 4,447,628 | 5/1984 | Farnham | 526/194 |

*Primary Examiner*—Paul R. Michl
*Attorney, Agent, or Firm*—Richard H. Burgess

[57] ABSTRACT

The duration of "livingness" in group transfer polymerization with oxyanion catalysts is enhanced by the presence of agents such as acetonitrile or silylated acetonitrile, resulting in higher molecular weight and/or lower polydispersity in the resulting polymers.

12 Claims, No Drawings

POLYMER LIFE ENHANCEMENT IN OXYANION-CATALYZED POLYMERIZATION

CROSS REFERENCE TO RELATED APPLICATIONS

This application is a continuation-in-part of application Ser. No. 707,194 filed Mar. 1, 1985, being abandoned.

BACKGROUND

This invention relates to a process for polymerizing polar o-olefinic monomers to "living" polymers and to the "living" polymers produced by such a process.

The technology known as group transfer polymerization is described in U.S. Pat. Nos. 4,417,034—Webster and 4,414,372—Farnham and Sogah, both granted in 1983. The former claims "living" polymers and their preparation from acrylic-type or maleimide monomers using defined organosilicon, -tin, or -germanium initiators and a catalyst which is a source of fluoride, cyanide or azide ions or a suitable Lewis acid. The latter is similar but uses as a co-catalyst a source of bifluoride ions. Both disclose various suitable solvents for the catalyst including acetonitrile used in amounts including 19 moles per mole of catalyst and more, and acetonitrile is used in larger quantities as a general solvent for the polymerization.

By "living" polymer is meant a polymer of the invention which contains at least one active terminal group and is capable of polymerizing further in the presence of monomer(s) and co-catalyst. The words "living" and "livingness" are used herein to quotation marks to distinguish from any biological conotations.

In attempts to use group transfer polymerization to better advantage, it would be desirable to find ways to increase or enhance the duration of the "livingness" of the polymerization. This would involve somehow decreasing the proportion of termination to further polymerization events. This could lead to higher molecular weight, lower polydispersity, and better control and predictability of molecular weight.

Related applications include Ser. Nos. 660,588 and 660,589 filed Oct. 18, 1984, now U.S. Pat. No. 4,581,428; 673,926 filed Nov. 21, 1984; and 676,099 filed Nov. 29, 1984, now abandoned. Also, application Ser. No. 707,193, filed Mar. 1, 1985, now U.S. Pat. No. 4,588,795, which discloses and claims the use of certain types of oxyanion catalyst in group transfer polymerization.

The disclosures of the above-mentioned patents and applications are hereby incorporated by reference.

SUMMARY OF THE INVENTION

The present invention provides a process of preparing a "living" polymer comprising contacting under polymerization conditions at least one polar monomer with (i) a polymerization initiator compound comprising a tetracoordinate metal selected from Si, Ge and Sn having at least one activating substituent or activating diradical attached thereto and optionally having one or more substituents that are inert under polymerizing conditions, (ii) a catalyst which is a salt comprising an oxyanion (including monooxyanion and/or bioxyanion) whose conjugate acid has a pKa(DMSO) of about 5 to about 24, and a suitable cation, and (iii) a polymerization life enhancement agent which moderates or retards the availability of said catalyst during polymerization so as to enhance the duration of "livingness" of the polymerization by increasing the proportion of polymerization events to termination events.

Preferably, the enhancement agent is selected from the group consisting of acetonitrile and silylated acetonitriles containing 1–3 equivalents of $R_3Si$-groups, per mole of acetonitrile, wherein R is hydrocarbyl of up to 20 carbon atoms, optionally containing one or more ether oxygen atoms within aliphatic segments thereof, and optionally containing one or more functional substituents that are unreactive under polymerizing conditions.

The preferred concentration of the enhancement agent is in the range of about 0.1–1000 moles per mole of catalyst, more preferably 1–200, sometimes optionally 5–25.

The preferred conjugate acid of the oxyanion catalyst has a pKa(DMSO) of about 6–21, more preferably 8–18.

DETAILED DISCLOSURE

While the mechanism or mechanisms operating in enhancing the duration of "livingness" in group transfer polymerization by means of the present invention are not completely known or fully understood, and applicants' do not wish to be bound by any theory, it can be hypothesized that the enhancement agent in some way complexes, associates with, or otherwise lowers the availability of the catalyst, perhaps gradually releasing it to keep the polymerization alive longer. The fact that silylated acetonitrile has a similar effect is interesting, especially when the initiator itself is an organic silylated compound. Either acetonitrile itself or silylated acetonitrile can promote longevity in these polymerizations.

Possibly the effect is to lower the activity of the catalyst, thereby reducing the proportion of catalyst-activated "living" ends resulting in a shift towards an increased ratio of polymerization to termination rates.

In the process of the invention, the polymer produced is "living" in that the polymerization is characterized by the presence, in the growing and in the grown polymer, of a moiety containing the aforesaid metal at "living" ends and the activating substituent or diradical, or a tautomer thereof, at "nonliving" ends of the polymer.

Monomers which are useful herein are of the formula $CH_2=C(Y)X$ wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$; each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula $-Z'-(O)C-C(Y^1)=CH_2$ wherein $Y^1$ is H or $CH_3$ and Z' is O or NR'; and each of R' and R" is independently selected from C$_{1-4}$ alkyl.

The initiator used in the polymerization of this invention is a silicon-containing initiator of U.S. Pat. Nos. 4,414,372, 4,524,196, 4,417,034 and 4,508,880 supra, and copending application Ser. Nos. 660,588, 660,589, 673,926 and 676,099. Initiators which are preferred for use herein are of the formula selected from (R$^1$)$_3$MZ, (R$^1$)$_2$M(Z$^1$)$_2$ and O[M(R$^1$)$_2$X$^1$]$_2$ wherein:

R$^1$ is as defined above;

Z is an activating substituent selected from the group consisting of

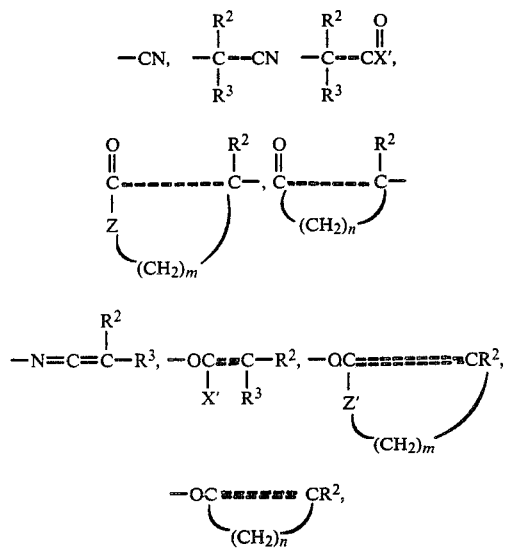

—SR, —OP(NR'R")$_2$, —OP(OR$^1$)$_2$, —OP[OSi(R$^1$)$_3$]$_2$ and mixtures thereof wherein R, R$^1$, R', R", X' and Z' are as defined above;

Z$^1$ is the activating substituent

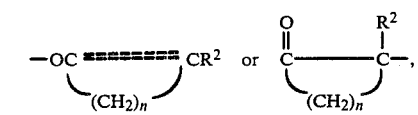

m is 2, 3 or 4;
n is 3, 4 or 5;
M is Si, Sn or Ge, provided, however, when Z is

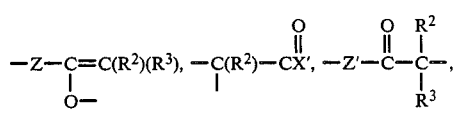

M is Sn or Ge; and
each of R$^2$ and R$^3$ is independently selected from H and hydrocarbyl, defined as for R above;

(a) at least one of any R, R$^2$ and R$^3$ in the initiator optionally containing one or more initiating substituents of the formula —Z$^2$—M(R$^1$)$_3$ wherein M and R$^1$ are as defined above;

Z$^2$ is an activating diradical selected from the group consisting of

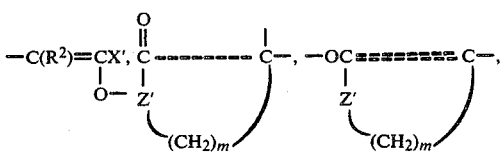

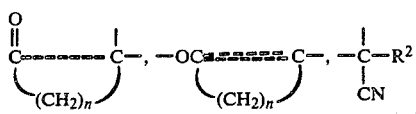

and mixtures thereof, wherein R$^2$, R$^3$, X', Z', m and n are defined above provided however when Z$^2$ is

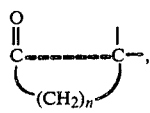

M is Sn or Ge, (b) R$^2$ and R$^3$ taken together are

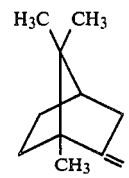

if Z is

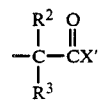

or —OC=C(R$^2$)(R$^3$) and/or Z$^2$ is

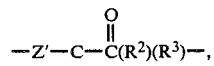

and
(c) X' and either R$^2$ or R$^3$ taken together are

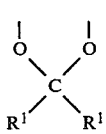

if Z is

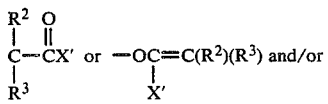

Z$^2$ is

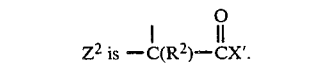

By conjugate acid is meant the acid formed by protonating the catalytic oxyanion; for example, the conjugate acid of acetate anion is acetic acid, and the biacetate anion is acetic acid dimer.

merization mixture after quenching. Data and results are given in Table 1.

TABLE 1

| Ex. | Catalyst | Cat, μL | I, g | MMA, g | Glyme, g | % Solids | % Conv. | $\bar{M}_w$ | $\bar{M}_n$ | $\bar{M}_n$ (theor.) | D |
|---|---|---|---|---|---|---|---|---|---|---|---|
| 1 | a | 250 | 1.1 | 62.2 | 97.6 | 38.4 | 99.8 | 31,300 | 12,500 | 9,800 | 2.5 |
| 2 | a | 250 | 1.0 | 61.2 | 97.5 | 39.3 | 103.2 | 26,500 | 16,300 | 10,700 | 1.6 |
| (Comp 1) | b | 250 | 1.0 | 61.1 | 97.7 | (low) | (very low) | — | — | 10,700 | — |
| (Comp 2) | c | 250 | 1.0 | 60.9 | 94.8 | 11.1 | 28.6 | 23,300 | 3,500 | 10,700 | 6.7 | a Tetrabutylammonium acetate, 1 M solution in acetonitrile (19 moles per mole of catalyst)
b Tetrabutylammonium octanoate, 1 M in tetrahydrofuran
c Tetrabutylammonium acetate, 1 M in tetrahydrofuran
I Initiator (MTS)
MMA methyl methacylate
D Polydispersity = $\bar{M}_w/\bar{M}_n$ By pKa(DMSO) of the conjugate acid is meant the negative logarithm of the acidity constant of the conjugate acid, measured in dimethylsulfoxide (DMSO) at 25° C. Methods for measuring pKa values of various acidic compounds, including oxyacids, are abundantly described in the literature, for example, by F. G. Bordwell et al., J. Org. Chem., 45, 3305 (1980); 46, 4327 (1981); 47, 3224 (1982); and 49, 1424 (1984).

Preferably the silylated acetonitriles used in the invention are made by reacting acetonitrile with an organosilicon compound of the formula $R_3Si—X$ wherein X is an appropriate leaving group such as halogen. R can be hydrocarbyl of up to 20 carbon atoms, optionally containing one or more ether oxygen atoms within aliphatic segments thereof, and optionally containing one or more functional substituents that are unreactive under polymerizing conditions; preferably it is a Cl-4 alkyl group, most preferably methyl.

In the following examples, the molecular weights of the polymer products ($\bar{M}_w$ and $\bar{M}_n$) were measured by gel permeation chromatography (GPC). The polydispersity of the polymer is defined by $\bar{D}=\bar{M}_w/\bar{M}_n$. Unless otherwise specified, any "living" polymer products which were obtained were quenched by exposure to moist air or methanol before molecular weights were determined. All temperatures are in degrees Celsius. All parts, proportions and percentages are by weight except where indicated otherwise.

PROCEDURE FOR EXAMPLES 1-2 AND COMPARISONS 1-2

A reaction vessel at room temperature was charged with 90-93 g of glyme and approximately 1 g of [(1-methoxy-2-methyl-1-propenyl)oxz]trimethylsilane (MTS) initiator. Fifty μL of catalyst solution (1M) was then injected into the reactor. Additional glyme and catalyst (feed 1), and MMA (feed 2), were fed into the reactor over 80 min and 60 min periods, respectively, starting concurrently. Temperature, which was monitored at 5 min intervals, indicated exothermic reaction in all cases. After 90 min, 2 mL of methanol was added to quench "living" polymer. Product polymer, after conventional work-up, was analyzed by GPC to determine molecular weight. Conversion to polymer was calculated based on the solids content of the final poly-

PROCEDURE FOR EXAMPLES 3-17 AND COMPARISONS 3 AND 4—METHYL METHACRYLATE CATALYZED BY VARIOUS TETRA(n-BUTYL)AMMONIUM OXYANION SALTS

To a 100 mL round-bottom flask containing a stirred solution of 30 mL of tetrahydrofuran and 0.20 mL (1.0 mmol) of [(1-methoxy-2-methyl-1-propenyl)oxy]trimethylsilane (MTS) was added various amounts of agent (see Table 1), followed by 0.02 mmol of tetrabutylammonium oxyanion catalyst (dissolved in a solvent in a concentration ranging from 0.28 to 0.55 molar). After 5 min, 5.0 mL (46.7 mmol) of methyl methacrylate was added dropwise at a rate of 1.0 mL/min. The reaction mixture exothermed. Exactly one h from the time at which the peak temperature was observed, a 0.5 mL sample of polymer solution (A) was withdrawn, after which 5.0 mL (46.7 mmol) of methyl methacrylate was added at a rate of 1.0 mL/min. A similar, but usually slightly lower, maximum temperature accompanied the resulting exotherm. One h. from the maximum exotherm temperature, a second 0.5 mL sample of polymer (B) was withdrawn and a third 5.0 mL (46.7 mmol) of methyl methacrylate was added at 1.0 mL/min. The third 0.5 mL sample of polymer (C) was withdrawn either one h from the peak exotherm temperature or 16 h later (the next morning). A fourth 5.0 mL (46.7 mmol) of methyl methacrylate was added (all at once) after the 16 h wait. If no exotherm followed this addition, an acetonitrile solution of 0.01 mmol of the oxyanion catalyst was added and the total polymer solution was quenched with methanol after an addition two h. The polymer was precipitated from hexane, dried at 80°/20 mm and a final polymer sample (F) was taken. The four polymer samples were then analyzed by GPC.

Catalysts and agents employed and the results obtained are given in Table 2. The $\bar{M}_n$ shown in Table 2 are those observed, but for polymerization Step C the theoretical values are also shown. The theoretical number average molecular weights for Step A were all 4780 except for Ex. 13 which was 4700. For Step B they were 9420 except Ex. 3 at 9510, Exs. 12 and 13 at 9555 and Exs. 14–17 at 9600. For Step F they were 19,600 except for Exs. 3 and 7 at 19,300.

TABLE 2

| Ex. | Oxyanion of Catalyst | Solvent for Catalyst | Agent | Moles Agent per Mole of Catalyst | % Conversion A/B/C/F | $\bar{M}_n$(A)/D | $\bar{M}_n$(B)/D | $\bar{M}_n$(C)/D | $\bar{M}_n$(F)/D | $\bar{M}_n$(C) (theor.) |
|---|---|---|---|---|---|---|---|---|---|---|
| 3 | Benzoate | CH$_3$CN | — | 68 | Q/Q/Q/L | 4580/1.38 | 10500/1.49 | 15200/1.81 | 18900/1.56 | 14140 |
| 4 | 0.7 Biacetate | CH$_3$CN | — | 64 | Q/Q/Q/L | 4860/ | 9560/ | 17200/ | 18600/ | 14230 |

TABLE 2-continued

| Ex. | Oxyanion of Catalyst | Solvent for Catalyst | Agent | Moles Agent per Mole of Catalyst | % Conversion A/B/C/F | $\overline{M}_n(A)/D$ | $\overline{M}_n(B)/D$ | $\overline{M}_n(C)/D$ | $\overline{M}_n(F)/D$ | $\overline{M}_n(C)$ (theor.) |
|---|---|---|---|---|---|---|---|---|---|---|
| (Comp 3) | 0.3 Acetic acid 0.7 Biacetate 0.3 Acetic Acid | Tetrahydrofuran (THF) | — | — | 54/L/- | 1.32 5300/ 1.74 | 1.50 8870/ 1.33 | 1.54 | 1.51 | |
| (Comp 4) | Benzoate | Toluene | — | — | 97/L/- | 4740/ 1.40 | 4840/ 1.46 | — | — | — |
| 5 | Benzoate | Toluene | CH$_3$CN | 48 | Q/Q/- | 4020/ 1.29 | 7800/ 1.60 | — | — | — |
| 6 | Benzoate | Toluene | CH$_3$CN | 95 | Q/Q/Q/L | 4250/ 1.54 | 7350/ 1.65 | 12400/ 1.79 | 14510/ 1.68 | 14510 |
| 7 | Benzoate | Toluene | CH$_3$CN | 6 | Q/Q/Q/L | 5830/ 1.07 | 12700/ 1.45 [3] | 29100/ 1.76 [2] | 20200/ 2.22 [2] | 14500 |
| 8 | Benzoate | Toluene | TMSAcN [3] | 0.6 | Q/Q/Q/L | 9700/ 1.04 | 18700/ 1.41 [1] | 16700/ 2.26 [2] | — | 14500 |
| 9 | Benzoate | Toluene | TMSAcN | 2 | Q/Q/Q/Q | 3830/ 1.05 | 7710/ 1.18 | 12300/ 1.32 | 17200/ 2.08 | 14500 |
| 10 | Benzoate | Toluene | TMSAcN | 6 | Q/Q/Q/L | 4130/ 1.07 | 7850/ 1.15 | 13200/ 1.21 | 13000/ 1.31 | 14500 |
| 11 | Benzoate | Toluene | TMSAcN | 7 | Q/Q/Q/L | 4700/ 1.09 | 9100/ 1.09 | 12800/ 1.30 | 13200/ 1.29 | 14500 |
| 12 | Benzoate | Toluene | TMSAcN | 11 | Q/Q/Q/L | 4410/ 1.05 | 8710/ 1.09 | 13300/ 1.17 | 13300/ 1.19 | 14400 |
| 13 | Benzoate | Toluene | TMSAcN | 34 | Q/Q/Q/Q | — | — | 11800/ 1.17 | 13400/ 1.38 | 14430 |
| 14 | 0.7 Biacetate 0.3 Acetic Acid | THF | TMSAcN | 6 | Q/Q/Q/Q | 4960/ 1.15 | 9770/ 1.16 | 17500/ 1.15 | 20500/ 1.44 | 14400 |
| 15 | Benzoate | Toluene | "Tris" [4] | 23 | Q/Q/Q/Q | 2470/ 1.20 | 4690/ 1.18 | 8470/ 1.20 | 10100/ 1.26 | 14400 |
| 16 | 0.7 Biacetate 0.3 Acetic acid | THF | "Tris" | 7 | Q/Q/- | 3930/ 1.11 | 7840/ 1.15 | — | — | — |
| 17 | Benzoate | Toluene | "Tris" | 2 | Q/Q/Q/- | — | 9080/ 1.16 | 14600/ 1.29 | | 14400 |

[1] bimodal $\overline{M}_w$ distribution
[2] trimodal $\overline{M}_w$ distribution
[3] TMSAcN = α-trimethylsilylacetonitrile
[4] "Tris" = tris-trimethylsilylacetonitrile NOTES:
"—" means no monomer added, therefore no data available
"L" denotes monomer added, but little if any yield
"Q" means essentially quantitative (100%) yield of polymer The examples and comparative tests demonstrate improvements in terms of increased molecular weight and lower polydispersity from use of the invention, particularly acetonitrile and silylated acetonitrile used as polymerization life enhancers.

These processes can be used to produce superior polymers by group transfer polymerization for the uses disclosed in the patents and applications incorporated herein by reference.

We claim:

1. Process of preparing a "living" polymer comprising contacting under polymerization conditions at least one polar acrylic-type alpha olefinic monomer with (i) a tetracoordinate organosilicon, organotin, or organogermanium polymerization initiator having at least one initiating site, (ii) a catalyst which is a salt comprising an oxyanion whose conjugate acid has a pKa (DMSO) of about 5 to about 24, and a suitable cation, characterized by also contacting with (iii) a polymerization life enhancement agent which enhances the duration of "livingness" of the polymerization by increasing the proportion of polymerization events to termination events.

2. A process of preparing a "living" polymer comprising contacting under polymerization conditions at least one polar acrylic-type alpha olefinic monomer with (i) a tetracoordinate organosilicon, organotin, or organogermanium polymerization initiator having at least one activating substituent or activating diradical attached thereto and optionally having one or more substituents that are inert under polymerizing conditions, (ii) a catyst which is a salt comprising monooxyanion or bioxyanion whose conjugate acid has a pKa(DMSO) of about 5 to about 24, and a suitable cation, characterized by also contacting with (iii) a polymerization life enhancement agent which is selected from the group consisting of acetonitrile and silylated acetonitriles containing 1-3 equivalents of R$_3$Si-group per mole of acetonitrile, wherein R is hydrocarbyl of up to 20 carbon atoms, optionally containing one or more ether oxygen atoms within aliphatic segments thereof, and optionally containing one or more functional substituents that are unreactive under polymerizing conditions.

3. The process of claim 2 wherein the enhancement agent concentration is in the range of about 0.1–1000 moles per mole of catalyst.

4. The process of claim 3 wherein the enhancement agent concentration is in the range of about 1–200 moles per mole of catalyst.

5. The process of claim 4 wherein the enhancement agent concentration is in the range of about 5–25 moles per mole of catalyst.

6. The process of claim 2 wherein the enhancement agent is acetonitrile.

7. The process of claim 2 wherein the enhancement agent is silylated acetonitrile.

8. The process of claim 2 wherein said conjugate acid has a pKa(DMSO) of about 6–21.

9. The process of claim 8 wherein said conjugate acid has a pKa(DMSO) of about 8–18.

10. The process of claim 2 wherein, in the silylated acetonitrile contains 1 equivalent of $R_3Si$-groups per mole of acetonitrile, and R is selected from $C_{1-4}$ alkyl groups.

11. The process of claim 2 wherein, in the silylated acetonitrile contains 3 equivalent of $R_3Si$-groups per mole of acetonitrile, and R is selected from $C_{1-4}$ alkyl groups.

12. The process of claim 10 wherein R is a methyl group.

* * * * *